(12) United States Patent
Chiu et al.

(10) Patent No.: US 7,237,152 B2
(45) Date of Patent: Jun. 26, 2007

(54) FAIL-OPERATIONAL GLOBAL TIME REFERENCE IN A REDUNDANT SYNCHRONOUS DATA BUS SYSTEM

(75) Inventors: Victor Y. Chiu, Glendale, AZ (US); Dale D. Davidson, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 616 days.

(21) Appl. No.: 10/692,972

(22) Filed: Oct. 24, 2003

(65) Prior Publication Data

US 2005/0102586 A1    May 12, 2005

(51) Int. Cl.
*G06F 11/00* (2006.01)

(52) U.S. Cl. ......................................................... 714/56

(58) Field of Classification Search .................. 714/55, 714/56; 713/375; 368/55
See application file for complete search history.

(56) References Cited

U.S. PATENT DOCUMENTS

| | | | | |
|---|---|---|---|---|
| 5,032,789 A | * | 7/1991 | Firooz et al. | 324/754 |
| 5,062,124 A | * | 10/1991 | Hayashi et al. | 375/356 |
| 5,068,877 A | * | 11/1991 | Near et al. | 375/356 |
| 5,289,116 A | * | 2/1994 | Kurita et al. | 324/76.11 |
| 5,357,491 A | * | 10/1994 | Yamasaki | 368/156 |
| 5,579,513 A | * | 11/1996 | Strohmer | 713/600 |
| 5,704,030 A | * | 12/1997 | Kanzaki | 714/12 |
| 5,870,441 A | * | 2/1999 | Cotton et al. | 375/354 |
| 5,881,113 A | * | 3/1999 | Lee | 375/354 |
| 5,991,844 A | * | 11/1999 | Khosrowpour | 710/312 |
| 6,107,818 A | * | 8/2000 | Czamara | 324/765 |
| 6,122,756 A | * | 9/2000 | Baxter et al. | 714/30 |
| 6,133,846 A | * | 10/2000 | Birkedahl et al. | 370/225 |
| 6,202,164 B1 | * | 3/2001 | Gulick | 713/400 |
| 6,279,058 B1 | * | 8/2001 | Gulick | 710/58 |
| 6,438,702 B1 | * | 8/2002 | Hodge | 713/400 |
| 6,606,675 B1 | * | 8/2003 | Godbole | 710/100 |
| 6,628,674 B1 | * | 9/2003 | Tanonaka | 370/503 |
| 6,658,579 B1 | * | 12/2003 | Bell et al. | 713/400 |
| 6,658,580 B1 | * | 12/2003 | Bell et al. | 713/400 |
| 6,665,316 B1 | * | 12/2003 | Eidson | 370/509 |
| 6,708,283 B1 | * | 3/2004 | Nelvin et al. | 714/5 |
| 6,868,509 B2 | * | 3/2005 | Gale et al. | 714/43 |
| 6,898,723 B2 | * | 5/2005 | Tsai | 713/500 |
| 6,907,472 B2 | * | 6/2005 | Mushkin et al. | 709/248 |
| 6,920,155 B2 | * | 7/2005 | Rao | 370/503 |
| 6,928,570 B2 | * | 8/2005 | Fukuda | 713/400 |
| 6,930,958 B2 | * | 8/2005 | Goergen | 368/10 |

(Continued)

*Primary Examiner*—Robert Beausoliel
*Assistant Examiner*—Elmira Mehrmanesh
(74) *Attorney, Agent, or Firm*—McDonnell Boehmen Hulbert & Berghoff LLP

(57) ABSTRACT

Methods and apparatus are provided for a fail-operational global time reference for a synchronous redundant data bus including multiple pluralities of timing servers cross-coupled between a plurality of buses in said redundant synchronous data bus system, the apparatus comprising each said timing server of the multiple pluralities of timing servers configured to transmit, receive, and monitor synchronization signals, to store a unique constant, and to independently and automatically select as timing master one or more timing servers from among the multiple pluralities of timing servers based on said synchronization signals received from one or more of said timing servers of said multiple pluralities of timing servers and further based upon a relationship among said unique constants stored in each timing server. Methods comprising selection protocols are also provided.

25 Claims, 5 Drawing Sheets

U.S. PATENT DOCUMENTS

| | | | |
|---|---|---|---|
| 6,980,568 B1* | 12/2005 | Reynov et al. | 370/503 |
| 6,988,221 B2* | 1/2006 | Rasmussen et al. | 714/12 |
| 7,035,246 B2* | 4/2006 | Taylor | 370/350 |
| 2002/0069299 A1* | 6/2002 | Rosener et al. | 709/248 |
| 2003/0093727 A1* | 5/2003 | Belschner et al. | 714/56 |
| 2003/0192000 A1* | 10/2003 | Vail et al. | 714/746 |
| 2005/0066211 A1* | 3/2005 | Heinrich et al. | 713/375 |

* cited by examiner

US 7,237,152 B2

FAIL-OPERATIONAL GLOBAL TIME REFERENCE IN A REDUNDANT SYNCHRONOUS DATA BUS SYSTEM

TECHNICAL FIELD

The present invention generally relates to data buses. The present invention more particularly relates to redundant synchronous data bus systems.

BACKGROUND

Data buses are made redundant to improve reliability: if one side, or bus, fails, the other can continue to operate. Primary and redundant data buses are typically synchronized to a single clock, or timing server, to enable simultaneous operation and rapid switchover in the event of a failure. While the data bus may quickly adapt to the failure of ordinary nodes, the failure of the timing server continues to present challenges to those seeking seamless redundancy. Existing methods use multiple timing servers having a master timing server and one or more redundant timing servers. In the event the master timing server fails, the remaining timing servers interactively negotiate by exchanging signals unique to the purpose of negotiation to determine which of the remaining timing servers will become the master. Operation of the data bus may be suspended during interactive negotiations, and data may be undesirably delayed.

Accordingly, it is desirable to have a seamless technique for responding to the loss of a master timing server, whether from failure of the master timing server itself or failure of the portion of the data bus coupled to the master timing server. In addition, it is desirable to have a selection protocol which obviates delays for interactive negotiations. It is also desirable to have a data bus with a seamlessly fail-operational global time reference. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

An apparatus is provided for an exemplary fail-operational global time reference for a redundant synchronous data bus system including multiple pluralities of timing servers cross-coupled between a plurality of buses in the redundant synchronous data bus system. The apparatus includes each timing server of the multiple pluralities of timing servers configured to transmit, receive, and monitor synchronization signals. Each timing server is further configured to store a unique constant and to independently and automatically select one or more timing servers from among the multiple pluralities of timing servers to be timing masters. The selection of timing masters is based on the synchronization signals received from one or more of the timing servers of the multiple pluralities of timing servers and on a relationship among the unique constants stored in each timing server.

A method of producing an exemplary fail-operational global time reference in a redundant synchronous data bus system having a plurality of data buses and further having first and second pluralities of timing servers cross-coupled between the plurality of data buses. The timing servers are operable to transmit time synchronization signals over at least one bus of the plurality of buses and further operable to receive time synchronization signals over two or more buses of the plurality of buses, wherein at least one timing server is selected to be a timing master. The method includes the steps of associating each timing server of the first and second pluralities of timing servers with a constant unique to each timing server and providing instructions to each timing server which are automatically and independently executable to select the same one timing server of the first and second pluralities of timing servers as timing master. The selection of timing server is based at least in part on the unique constant associated with each timing server and further based at least in part on the time synchronization signals received by said each timing server. The instructions are further executable to synchronize the timing servers to the selected timing master.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
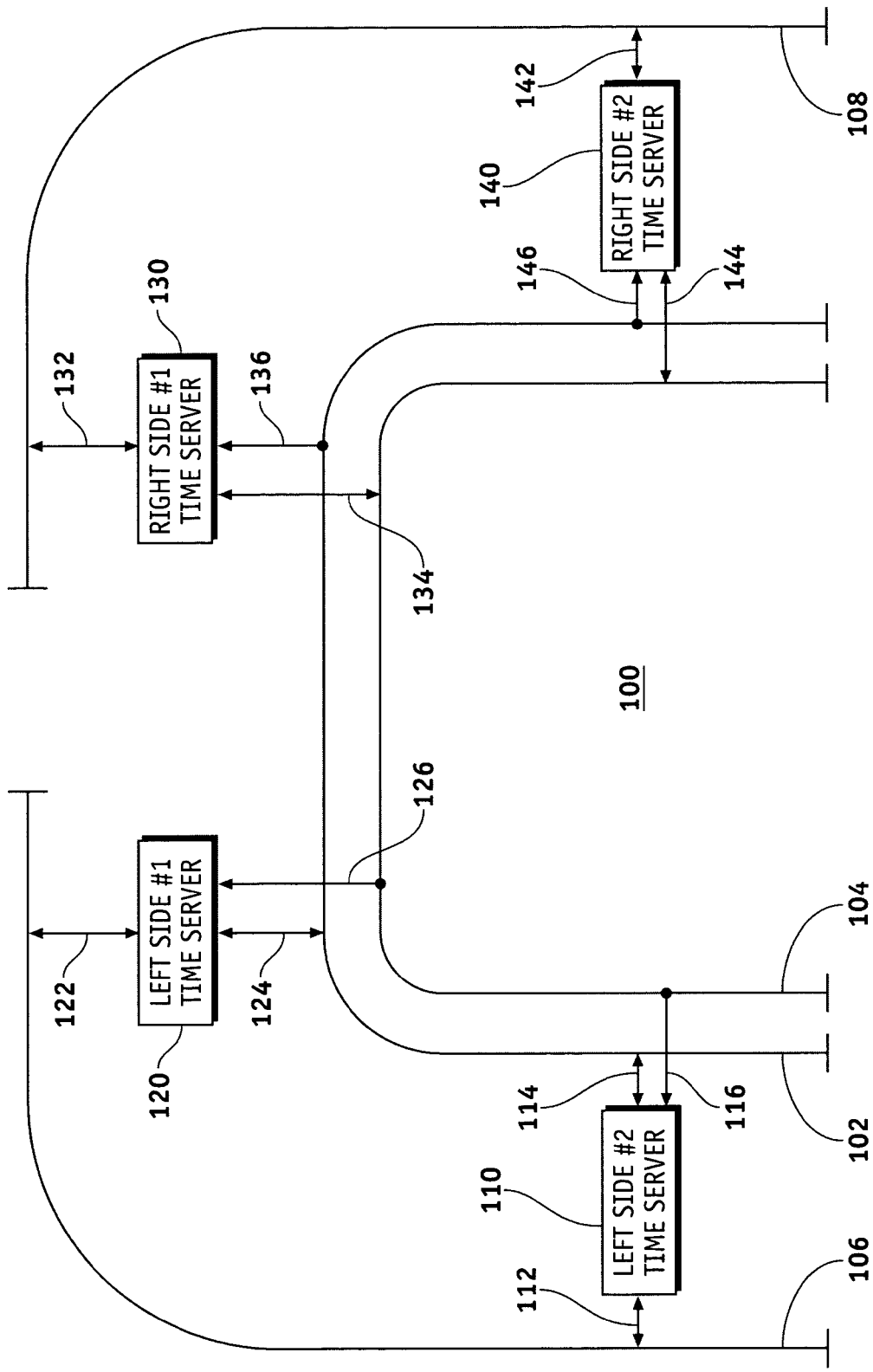
FIG. 1 is a block diagram of an exemplary redundant data bus in a dual-dual configuration having differentially cross-coupled timing servers.

The following detailed description is based upon an exemplary embodiment of the present invention in a dual-dual synchronous redundant data bus 100 (FIG. 1). It will be appreciated that the present invention also works with other synchronous redundant data bus configurations, such as a dual-single configurations. No limitation on the configuration of the synchronous data bus is implied by exemplary embodiments herein described.

FIG. 1 shows an exemplary embodiment of a synchronous redundant data bus 100 in a dual-dual configuration having a plurality of timing servers 110, 120, 130, and 140. The first duality in the dual-dual configuration is in the primary bus between the left-side primary bus 102, and the right-side primary bus 104. The second duality in the dual-dual configuration is in the redundant bus between the left-side redundant bus 106 and the right-side redundant bus 108. Each "side" is one bus in the synchronized redundant bus system of four buses. The left sides 102 and 106 of the buses are also redundant to the respective right sides 104 and 108.

Timing servers 110, 120, 130, and 140 provide timing synchronization signals to components on the buses over which the timing servers are cross-coupled. The receiving components, or clients, use the timing synchronization signals to coordinate their actions, including use of the bus. A first left-side timing server 120 is coupled to the left side of the primary bus 102 by a bidirectional (send and receive) data link 124 and is coupled to the left-side of the redundant data bus 106 by another bidirectional data link 122. The link may be of any conventional type adapted to the particular bus. A timing server coupled between two or more buses in a redundant bus system is said to be cross-coupled. The first left-side timing server 120 is also coupled to the right side of the primary data bus 104 by a unidirectional (receive-only) data link 126. Accordingly, timing server 120 can receive data, such as synchronization messages, from the left-side primary and redundant data buses 102 and 106, and from the right-side primary data bus 104. A second left-side timing server 110 is coupled to the left side of the primary bus 102 by bidirectional data link 114 and to the left side of the redundant data bus 106 by another bidirectional data link 112. The second left-side timing server 110 is also coupled to the right-side of the primary data bus 104 by a unidirectional data link 116. Accordingly, timing server 110 can receive data, such as synchronization messages, from the left-side primary and redundant data buses 102 and 106 and from the right-side primary data bus 104. The second left-side timing server 110 is coupled to the synchronous redundant data bus 100 in parallel with the first left-side timing server 120. In some alternate embodiments, link 126 may be a bidirectional data link 126 with only the receiving channel used or with the transmit channel used only for particular failure scenarios (e.g., all other timing servers on bus 104 fail). Minimizing data transmission with the use of unidirectional links 116, 126, 136, and 146 may provide preferred for bandwidth conservation and speed.

A first right-side timing server 130 is coupled to the right side of the primary bus 104 by a bidirectional data link 134 and to the right side of the redundant data bus 108 by another bidirectional data link 132. The first right-side timing server 130 is also coupled to the left side of the primary data bus 102 by a unidirectional data link 136. Accordingly, timing server 130 can receive data, such as synchronization messages, from the right-side primary and redundant data buses 104 and 108, and from the left-side primary data bus 102. A second right-side timing server 140 is coupled to the right side of the primary bus 104 by a bidirectional data link 144 and to the right side of the redundant data bus 108 by another bidirectional data link 142. The second right-side timing server 140 is also coupled to the right-side of the primary data bus 102 by a unidirectional data link 146. Accordingly, timing server 140 can receive data, such as synchronization messages, from the right-side primary and redundant data buses 104 and 108 and from the left-side primary data bus 102. The second right-side timing server 140 is coupled to the synchronous redundant data bus 100 in parallel with the first right-side timing server 130.

Each right-side timing server 130 and 140 transmits synchronization messages to right-side buses 104 and 108. Likewise, each left-side timing server 110 and 120 transmits synchronization messages to left-side buses 104 and 108. Each timing server on a particular side (110, 120, or 130, 140) can receive synchronization signals from the opposite side, or cross-side, timing servers (130, 140, or 110, 120). In some embodiments, there may be more than two timing servers coupled to a particular side. The cross-coupling scheme for timing servers 110 and 120 is different and complimentary to the cross-coupling scheme for timing servers 130 and 140. Timing servers 110 and 120 receive from the right side primary bus and send and receive from the left-side primary and redundant busses. Timing servers 130 and 140 receive from the left side primary bus and send and receive from the right-side primary and redundant busses. Accordingly, the timing servers may be described as differentially cross coupled or complimentary differentially cross coupled to the synchronized redundant bus system 102, 104, 106, and 108. It will be appreciated that, while FIG. 1 shows four timing servers in a synchronized bus system with dual-dual redundancy, more timing servers may be added, providing potentially greater reliability for the overall system.

Anyone of the timing servers 110, 120, 130 and 140 may be the timing master. The timing master is the one timing server to which all other timing servers synchronize their time service signals. The time service signals may be time synchronization messages contained within a message frame having a predetermined temporal length and produced at a predetermined frequency. Timing synchronization signals of any variety and form may be used within the present invention.

Each operable timing server 110, 120, 130, and 140 periodically transmits a time synchronization signal, or time synchronization message, over the synchronous redundant bus system 102, 104, 106, and 108. The periodic transmissions are shifted in phase so that only one synchronization signal is being transmitted on each side at any given time. The phase shift is controlled as part of the timing synchronization process. One of the timing servers is designated as the timing master by a start-up process or later selection as described in more detail below, and will periodically transmit a timing master synchronization signal. The timing master synchronization signal is the signal to which the other timing servers will synchronize their time synchronization signals. The timing master synchronization signal is a timing synchronization signal associated with data indicating that it was sent by the timing master. In an exemplary embodiment, the timing master synchronization signal may differ from other time synchronization signals by a single data bit. Accordingly, the synchronization signals sent to and from all timing servers 110, 120, 130, and 140 in an exemplary embodiment of the present invention may be the only communications between timing servers 110, 120, 130, and 140.

Each timing server 110, 120, 130 and 140 includes an identical copy of a set of rules, or selection protocol, and a unique constant. In various embodiments, a one-to-one association of unique constants to timing servers is established by software, manufacture, or operator input. Each unique constant may be a counting number, perhaps binary, and each differs from the others by an amount depending upon the synchronization frame period and the internal clock speed of the timing servers. The difference between unique constants appropriately requires a time period longer than a frame synchronization period to count through at the internal clock speed keying the counter. In a particular embodiment, the unique constant may also be an identification number. In alternate embodiments, various counters may be used to count to the unique constant within the constraint that the differences in counting times to the different unique constants be greater than the length of the frame synchronization period. Both or either of up-counting and down-counting may be used.

Figure 2:
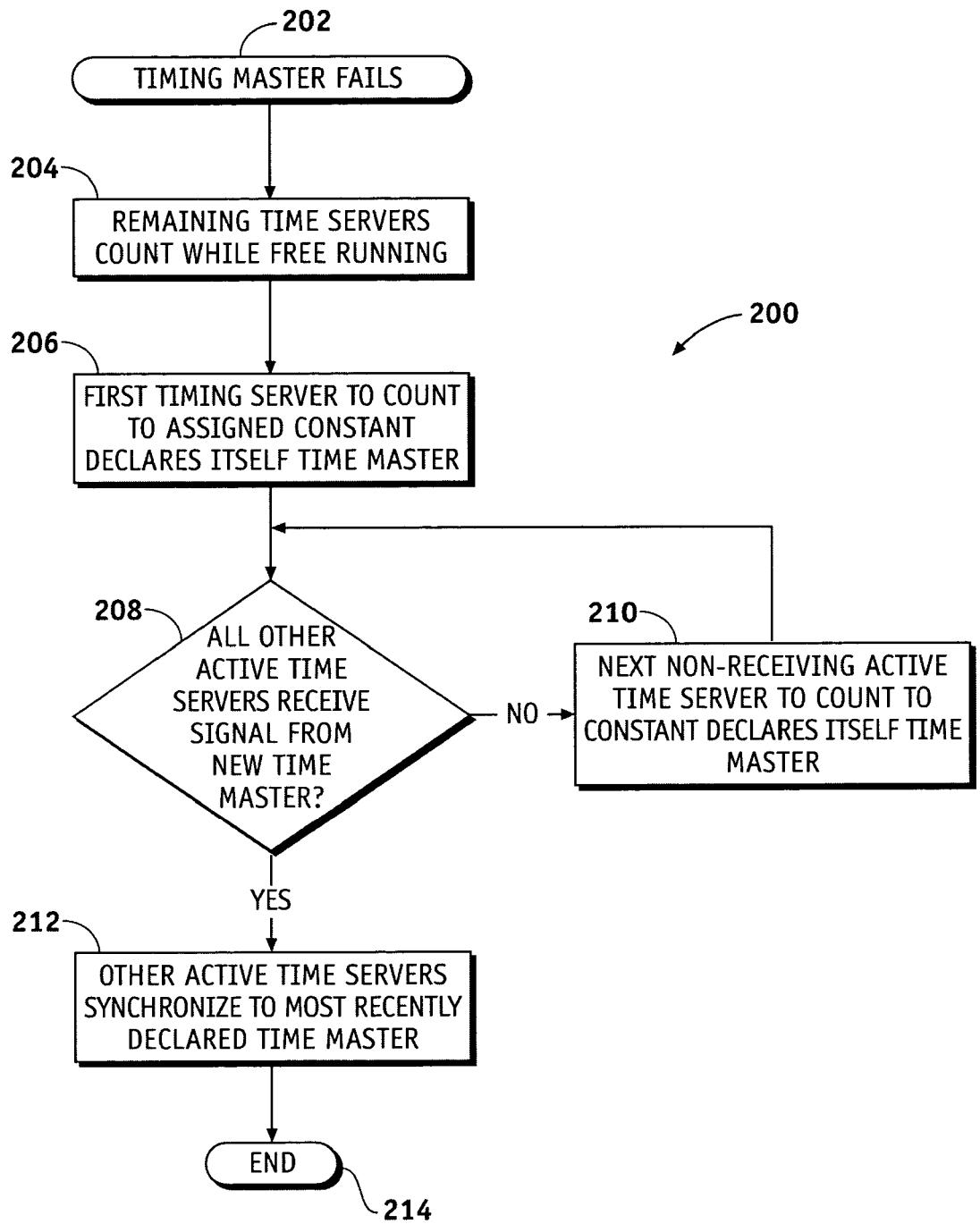
FIG. 2 is a flowchart of a portion of an exemplary selection protocol responsive to the failure of the master timing server.

FIG. 2 shows a flowchart of an exemplary selection protocol 200 for selecting a timing master in a fail-operational global time service. Absent a failure of the current timing master, process 200 does not typically begin: the current timing master simply continues operating. Process 200 begins in step 202 when the timing master fails. For example, if right-side timing server 130 (FIG. 1), is the timing master 130, process 200 may initiate upon the failure of timing master 130. The failure of the timing master 130 may result from any cause. Examples of potential failures for timing master 130 include failure of any one of several internal integrity tests, failure of any one of several external integrity tests, and/or a bus failure which prevents the synchronization signal or time synchronization message sent by the timing master 130 to reach all other timing servers 110, 120, and 140. The tests will be discussed in more detail below. When the timing master 130 fails, remaining timing servers 110, 120, and 140 continue to run freely and each initiates a counter at a common starting point in step 204. The free-running of timing servers 110, 120, and 140 enable time service to continue to be supplied for a brief period without closed-loop synchronization. While this condition may not be ideal, deviations from synchronization are commonly the results of a slow accumulation of small errors which eventually exceed a tolerance. Operationally, time service clients on the bus still have a time reference signal available for use during the free-running period.

Each of the timing servers 110, 120, and 140 counts for different periods of time, due to the common starting point and the different predetermined constants in each timing server. In step 206, the first timing server to complete counting to its unique constant declares itself to be the new timing master by sending out the timing master synchronization signal to all timing servers remaining active after the failure of the prior timing master 130. All of the remaining timing servers which receive the timing master synchronization signal will synchronize to it, reset their counters, and stop counting. As can be seen from FIG. 1, any of the remaining timing servers 110, 120, and 140 can receive signals from each other. Accordingly, the system has substantially recovered time synchronization in the time it takes the timing server with the lowest unique constant to count up to that constant, plus the time it takes to communicate and obtain responses to the new timing master synchronization signal. Note that step 208 includes the results of the autonomous actions of the remaining timing servers 110, 120, and 140, and does not require a controller for interaction between the timing servers. Rather, all that is required of the timing servers is the usual reception of time synchronization signals, counting, and, for one timing server, an internal decision to become the timing master. The failed original timing server 130 may undertake a recovery procedure as shown in step 302 of FIG. 3, which typically consumes longer time than the time required for a new timing master to emerge. When the original timing master 130 has recovered, it appropriately synchronizes to the new timing master and operates as a timing server as shown in step 304.

In cases of multiple failures, a particular timing server may be unable to receive timing master synchronization signals from the newly declared timing master. For example, if simultaneous failures occur in timing master 130 and the right-side primary bus 104, and if timing server 140 counts up to become the new master, neither of the left-side timing servers 110, 120 will be able to receive the timing master synchronization signal from timing master 140. As a result of not receiving the timing master synchronization signal (the "NO" branch from step 208), the left-side timing servers continue to count, and the first to reach its unique constant declares itself to be the new timing master by sending out the timing master synchronization signal. For this example, timing server 110, as well as timing server 140, may now be sending out timing master synchronization signals. Step 208 is therefore repeated for the newly declared timing master 110 but, because all remaining timing servers 120 and 140 are receiving the timing master synchronization signal from timing master 110, the result of step 208 is different. When timing master 140 receives, via link 114, bus 102, and link 146, the timing master synchronization signal from newly declared timing master 110, timing master 140 relinquishes its claim to being the timing master by cessation of sending timing master synchronization signals. Furthermore, the timing server 140 synchronizes to the timing master synchronization signal received from timing master 110. Timing server 120 synchronizes to timing master 110 in the way already described. This exemplary process 200 ensures that the timing master synchronization signal can be received by all active timing servers 120 and 140 after even multiple failures. Accordingly, fail-operational performance is provided against all single and some double failures. Note that, if both sides 102 and 104 of the primary bus fail, one timing server and one timing master will emerge on each side 106 and 108 of the redundant bus, and each of these servers will continue to operate until communication on the primary bus is restored. It will be appreciated that an advantage of this technique is that no signals unique to the purpose of negotiation are exchanged between timing servers: only the ordinary time synchronization signals are used. It will also be appreciated that there is no cessation of timing operations during the period when a new timing master is being determined.

Figure 3:
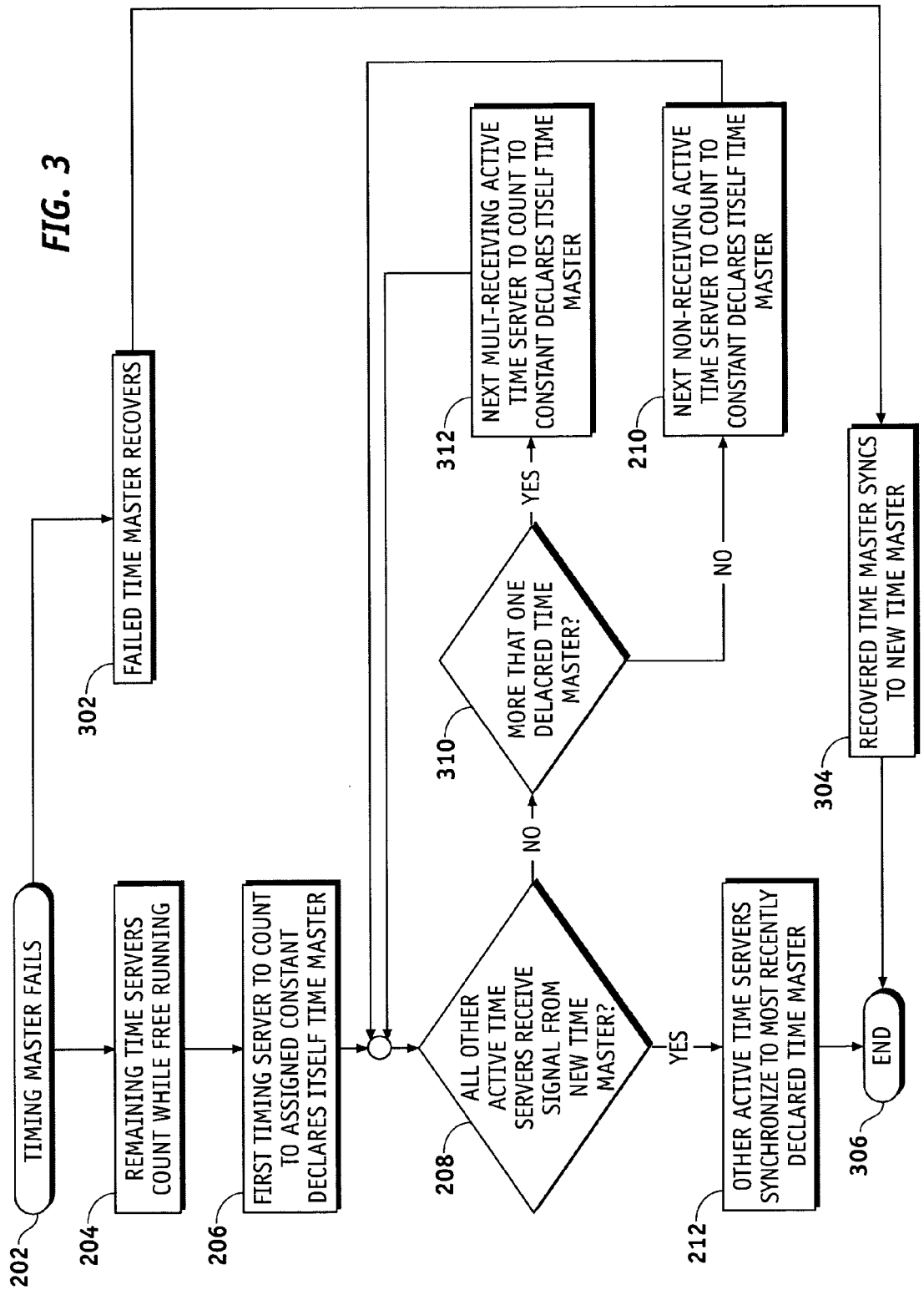
FIG. 3 is a flowchart of an exemplary selection protocol responsive to multiple failures, including failure of the master timing server.

FIG. 3 shows a flowchart of an exemplary selection protocol 300 adapted for a multiple-failure case. Steps 202, 204, 206, 208, 210, and 212 perform substantially the same functions as described above in relation to FIG. 2. Selection protocol 300 addresses the problem of how to respond when step 208 determines that each of two timing masters are not each receiving the master synchronization signal of the other. This condition may be evidenced by the emergence and persistence of two timing masters. The second timing master emerges because it cannot receive the signals of the first timing master which was determined by process 200. The first timing master persists because it cannot receive the timing master signals of the second timing master. If step 310 determines that there is not more than one declared timing master, process 300 proceeds to step 210 and continues as in process 200. If step 310 detects the case where the failure scenario creates more than one timing master, neither of which relinquish control over a predetermined time or predetermined number of synchronization frames, process 300 proceeds to step 312. The predetermined time or number of synchronization frames is specified to be longer than the time required for a timing master to relinquish control and may be greater than the time required for all timing servers to have declared themselves timing masters. Such a result may occur when none of the transmitting timing masters can receive the timing master synchronization signal from the others.

Extending the example used in relation to FIG. 2, if the left-side of the bus 102 was also broken between link 114 and link 124, timing master 140 would not have been able to receive the timing master synchronization signal from candidate timing master 110, causing them both to continue to send timing master synchronization signals. In this case, the remaining timing server 120, which continues to receive multiple timing master synchronization signals from multiple sources 110 and 140, begins or continues counting, and declares itself timing master as depicted in step 312 when the constant unique to timing server 120 has been reached. Both timing server 110 and timing server 140 can receive the timing master synchronization signal from timing master 120 and so will cease sending timing master synchronization signals and will synchronize with timing master 120. The timing server that failed as timing master to initiate process 300 in step 202 automatically attempts recovery in step 302, typically after a short waiting period to avoid interfering with the process 200 or 300 of determining a new timing master. If successful in recovering, the recovered timing server synchronizes to the new timing master.

In the extreme case where no timing server can receive a timing master synchronization signal from any declared timing master (e.g. dual redundant bus failures), each timing server will eventually consider itself a timing master and will serve those clients still connected. The apparatus of FIG. 1 using process 300 degrades gracefully and may maintain time service to at least some clients for as long as at least one connected timing server continues operation. As long as one left-side timing server 110 or 120, and one right-side timing server 130 or 140 operates, all portions of operable buses can be provided with time service.

Figure 4:
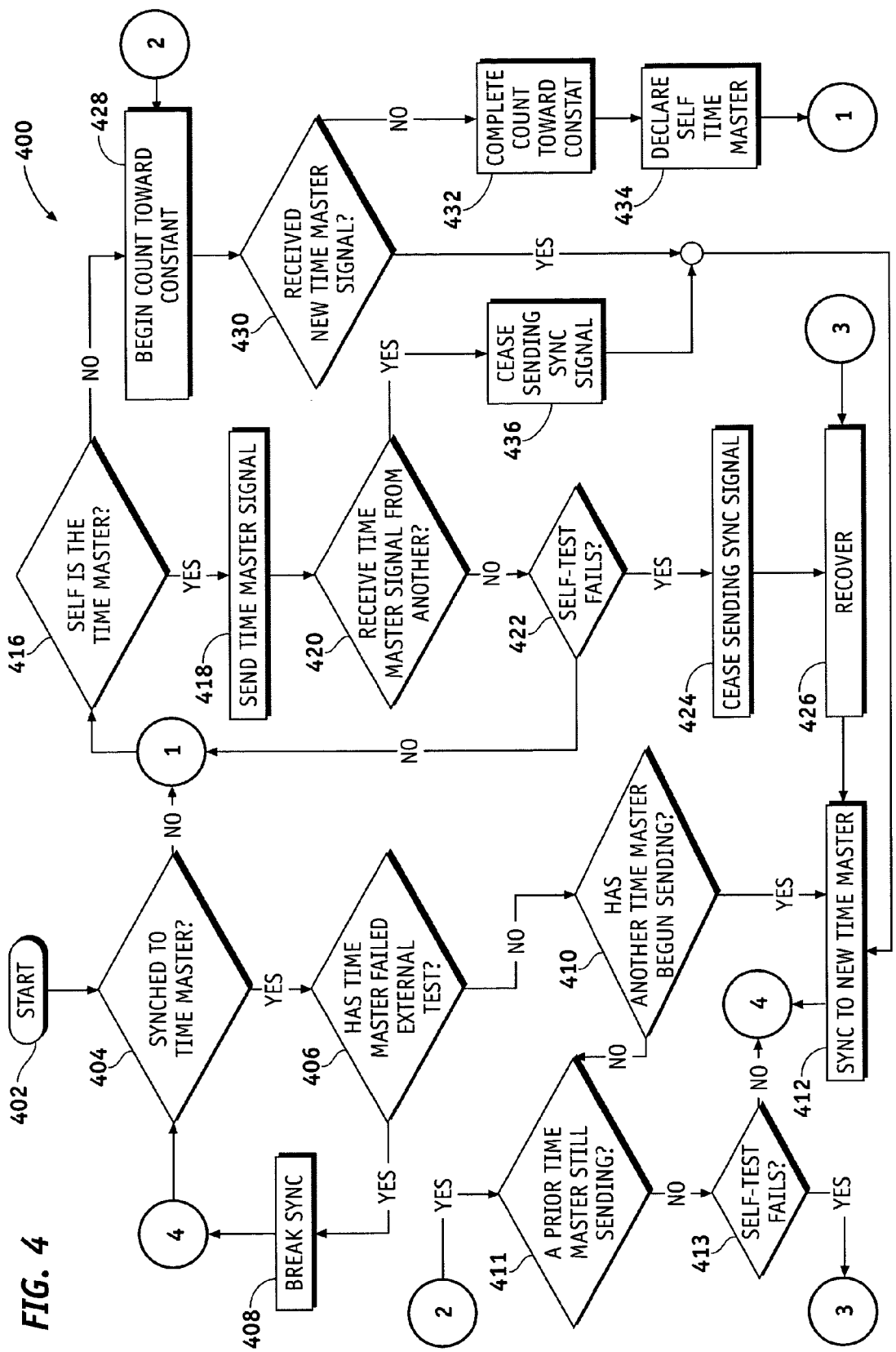
FIG. 4 is a flowchart of a portion of an exemplary selection protocol responsive to two or more simultaneously transmitting timing masters.

FIG. 4 is a flowchart of an exemplary embodiment of a selection protocol 400 for operating a timing server in a fail-operational global time-reference system from the individual timing server's point of view. FIG. 4 shows an exemplary embodiment of the selection protocol 400 executed in each timing server 110, 120, 130, and 140. Process 400 begins in step 402 after system start-up. Start-up includes designation of a timing master by any known technique, including arbitrary designation. In step 404, the timing server determines whether it is synchronized to the timing master. If step 404 determines that the timing server is synchronized to the timing master, the timing server tests the timing master synchronization signal and determines, in step 406, whether one or more tests was passed or failed.

In an alternate embodiment, step 406 may precede, rather than follow, step 404. Accordingly, the receiving time server may validate the timing master synchronization signal before using it for the selection process. The receiving timing server may determine that the timing master synchronization signal is valid if it passes a receiving test. For example, the receiving test may test temporal aspects of the received timing master synchronization signal or temporal relationships between the received timing master synchronization signal and other timing signals. If the timing master synchronization signal is determined to be failed or absent in step 406 of the alternate embodiment, then step 404 regards the timing master as failed.

Referring again to the embodiment depicted in FIG. 4, it will be appreciated that, while the test or tests in step 406 are external to the timing master, they are performed by the timing server based upon the received timing master synchronization signal and optionally its relationship to time synchronization signals from other time servers. External tests may include, for example, tests for periodicity, for the size of the temporal gap between successive synchronization signals, for errors in the order of arrival of synchronization signals, and/or for absence of a particular synchronization signal. If step 406 determines if a timing master has failed any of the external tests, the testing time server breaks synchronization with the master timing server and begins free-running in step 408. Step 408 includes performance of a self-test, similar to that performed in step 413. If the self test in step 408 fails, the receiving server attempts recovery in step 426 (these details have been omitted from FIG. 4 to avoid overcrowding the image). Otherwise, control passes to step 404. The self test in step 408 determines that the receiving server has enough integrity to actively replicate the timing master while transmitting timing signals. Step 406 also includes the testing timing server testing each synchronization signal, whether from the timing master or from other timing servers. If the synchronization signal of a timing server fails one or more tests in step 406, the testing timing server does not make use of that failed timing master synchronization signal in further external tests 406 or internal tests 413 and 422 which will be described in more detail below. Accordingly, some tests, such as the gap test, are designed to adapt to one or more synchronization signals being unusable. However, the testing timing server does not typically notify other timing servers of the test results.

If the test of the timing master synchronization signal fails, the testing timing server determines, in step 410, whether it has begun receiving an additional timing master synchronization signal. If step 410 does not determine that it is receiving an additional timing master synchronization signal, step 411 determines if a timing master synchronization signal from a prior timing master is still being received. If no timing master synchronization signal from a prior timing master is being received, step 413 may conduct monitoring in addition to that done in step 408 through self-tests and determine the outcome of those tests. In some alternate embodiments, only the self-test of step 408 may be used. If step 413 determines that no self-test has failed, the timing server loops back to step 404. The loop formed by steps 404, 406, 410, 411, 413, and 404 is a stable system state loop for a timing server in the fail-operational global time reference system: there is one timing master producing timing master synchronization signals and the timing server is synchronized to that one timing master.

If step 410 determines that a timing master synchronization signal from a second timing master has been received, the timing server first synchronizes to the second timing master synchronization signal in step 412 and then loops back to step 404. The reason for this change of timing masters is that, following the process 400, a second timing master win not typically emerge unless it cannot receive the timing master synchronization signal from the first timing master. Accordingly, the emergence of the second timing master means that the first timing master cannot reach all other timing servers with its timing master synchronization signal and so cannot remain timing master. A timing master should, if at all possible, reach all timing servers. By the same logic, if step 411 determines that a prior timing master is still active, or has remained active for more than a predetermined period, then it follows that neither of the active timing masters can receive signals from the other and so neither should function as the timing master if a better alternative is available. Accordingly, the timing server begins counting toward a constant in step 428 and may proceed through steps 430, 432, and 434 to become the new timing master, as described in more detail below.

If monitoring step 413 determines that the timing server failed one or more self-tests, the timing server stops transmitting its synchronization signal and attempts to recover in step 426. Recovery may, for example, include remaining inactive for a predetermined period and then re-synchronizing to the timing master. The self-tests of step 413 may include one or more of, for example, a synchronization signal wrap around test, a frame tick periodicity test, and a local clock integrity test. The frame tick is a timing signal which marks the beginning of a data frame. Synchronization includes controlling the frame ticks of all timing servers to occur at the same time. The wrap-around test comprises receiving a particular synchronization signal by the timing server that transmitted it and comparing the timing and content of the received signal to the sent signal.

If, in step 406, the timing server determines that the timing master synchronization signal has failed an external test, the timing server breaks synchronization with the failed timing master in step 408 and may begin free-running while process 400 loops back to step 404. If step 408 determines that there is another timing master with a valid sync message, then the time server will synchronize to that timing master in step 408 and the result of step 404 will be positive. If the timing server finds no new timing master in step 408, the result of step 404 will be negative and process 400 will continue at step 416. Step 416 determines if the timing server is the timing master. If so, step 418 transmits the timing master synchronization signal. If the timing server is not the timing master, the timing server begins counting toward its unique constant in step 428. The constant is unique to avoid temporal conflicts between timing servers which may become the timing master. If, while the counting begun in step 428 is in progress, step 430 determines that the timing server has received a valid timing master synchronization signal, the timing server synchronizes to the timing master synchronization signal in step 412 and loops back to step 404. Such a valid time master synchronization signal may come from, for example, a time server with a smaller unique constant and correspondingly shorter counting time. If step 430 determines that no timing master synchronization signal has been received during the count begun in step 428, the count completes in step 432. Once the count completes in step 432, the timing server declares itself to be the timing master in step 434. The declaration may have no outwardly noticeable effects until the process 400 transitions through decision step 416 to step 418.

In an alternate embodiment, one or more steps 410, 420, and 430 may include further limitations on timing master selection. For example, in a multi-master contention, a preference for a timing master on the same side of a redundant bus as the selecting timing server or selecting timing master may be expressed in one or more of the steps 410, 420, and 430 or even step 412. For further example, where two cross-side timing masters are active, a same-side timing server or timing master may chose to continue autonomously until the cross-side conflict is resolved.

Step 418 transmits the timing master synchronization signal from the timing server to multiple other timing servers. Step 420 determines if a second timing master synchronization signal is being received by the timing server in its role as first timing master. If step 420 determines that a second timing master synchronization signal is being received, the first timing master ceases to transmit its timing master synchronization signal in step 436 and synchronizes to the second timing master synchronization signal in step 412. In an exemplary embodiment, the timing between steps 420 and 436 may be controlled with a timer, or multi-master counter, that counts for a predetermined number of frames before initiating step 436. The multi-master counter may be set for a time period which will allow a contending timing master to be selected by other timing servers before the first timing master relinquishes control.

If step 420 determines that no second timing master synchronization signal has been received, then step 422 monitors the timing master synchronization signal using internal integrity tests and determines if a test has been failed. The self-tests of step 422 may include one or more of, for example, a synchronization signal wrap-around test, a frame tick periodicity test, and a local clock integrity test, which may be the same self-tests used in step 413. If step 422 determines that no test was failed, process 400 loops back to step 416. The loop including steps 416, 418, 420, 422 and 416 is a stable system state for a timing master in the fail-operational global time reference system: there is one timing master producing timing master synchronization signals and other timing servers are synchronized to that one timing master.

If step 422 determines that a test has been failed, then the timing server relinquishes its role as timing master and ceases transmitting the timing master synchronization signal in step 424. The timing server of the failed timing master then begins a recovery procedure in step 424, such as a reboot or off-line period, which is typically long compared to the time used to select a new timing master. Once recovery is complete, the recovered timing server synchronizes to the new timing master in step 412 and then enters the stable state loop for timing servers at step 404.

It will be appreciated that the exemplary method 400 of the present invention does not require transmission by timing servers of messages useful only for selecting a timing master. Rather, preferred exemplary embodiments of the present invention use only the timing master synchronization signal and timing server synchronization signals as a basis for making automatic and independent (e.g., autonomous) decisions as to which timing server shall be the timing master. Because the failure of a timing master does not interrupt the synchronization signals transmitted by other timing servers (e.g., they briefly free-run), clients of the timing servers remain operational through a timing master failure. Accordingly, the method 400 of present invention provides a truly fail-operational global time reference for a synchronous redundant bus system.

While FIG. 1 illustrates a synchronous bus system with dual-dual redundancy (dual buses each with dual sides), it will be appreciated that the methods 200, 300, and 400 will also work with any other N–M redundant configuration, where N is the number of primary bus sides and M is the number of redundant bus sides. For example, method 400 may be applied to bus configurations such as dual-single, single-dual, and single-single redundant systems, whether designed as such or resulting from degradation of a dual-dual configuration. In addition, it will be appreciated that the selection protocols 200, 300, and 400 of exemplary embodiments may be extended in equivalent ways to redundancies greater than dual (e.g. triplex and higher order buses).

Selection protocols 200, 300, and 400 may be implemented as a set of instructions in software, hardware, firmware, or the like. A software copy of selection protocols 200, 300, 400 may take the form of a set of selection protocol instructions in a computer language such as a machine language or a higher-order language which may be compiled or interpreted into machine language. The selection protocol instructions and, optionally, related data structures and data, may be marketed as a program product on signal-bearing media such as recording media, transmission media, or a memory in timing server.

Figure 5:
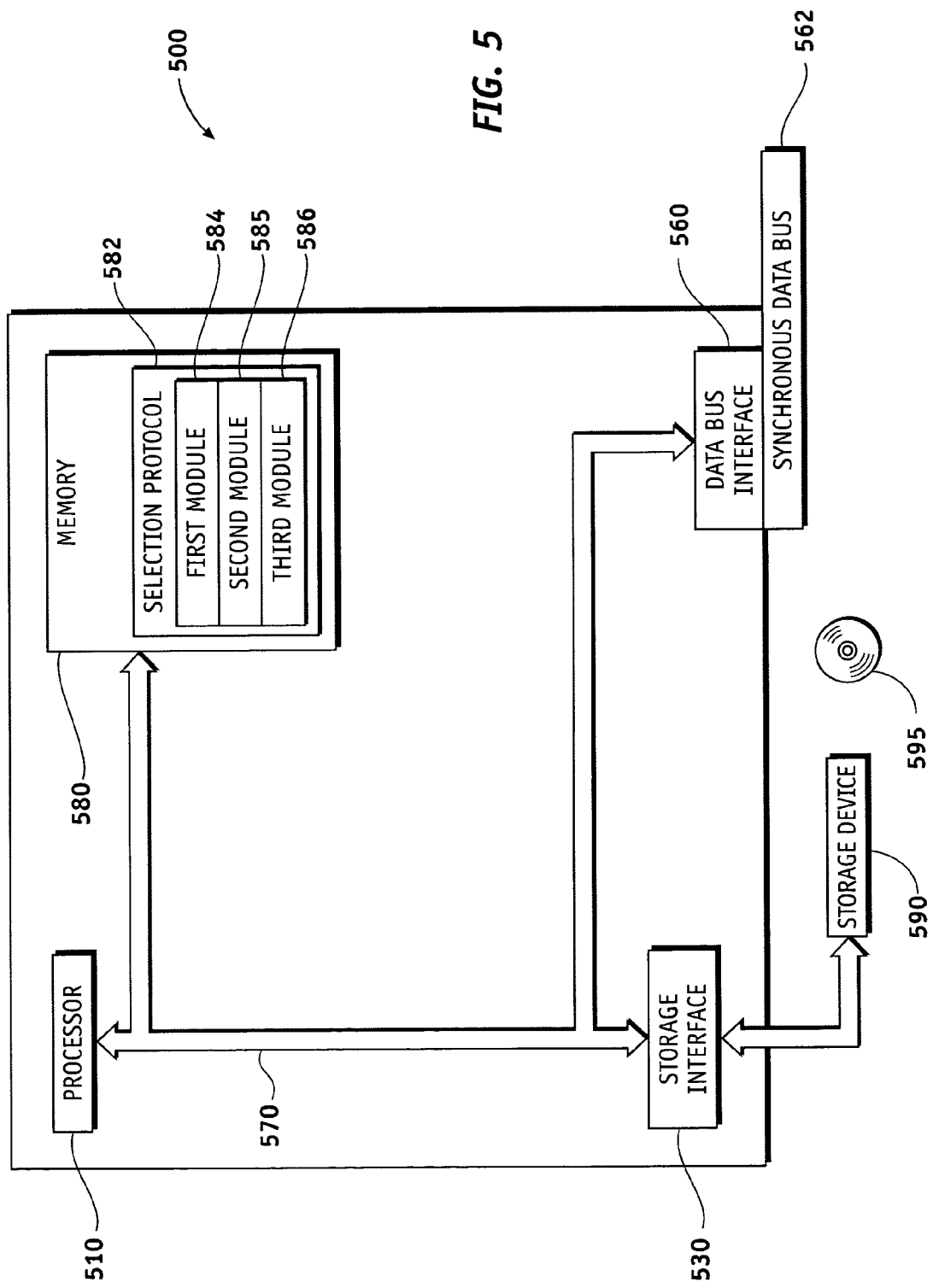
FIG. 5 is a block diagram of an exemplary timing server.

FIG. 5 depicts a timing server 500 coupled to one or more synchronous data buses 562 through a data bus interface 560. Timing server 500 has a processor 510 coupled to a memory 580 and to the data bus interface 560 by internal data bus 570. Timing server 500 may also have a storage interface 530 coupled to internal data bus 570 for obtaining stored data from storage device 590. Storage device 590 may be any conventional type of data storage and may receive conventional removable storage media exemplified by CD-ROM 595. Memory 580 includes, among other things, selection protocol software 582 which implements a selection protocol such as those exemplified by selection protocols 200, 300, and 400 when executed in processor 510.

Selection protocol software 582 may comprise software modules 584–586. First module 584 may be configured to control timing server 500 to transmit synchronization signals and to receive and monitor synchronization signals from each timing server coupled to one or more synchronous data buses 562, including itself. Second module may be configured to store the constant unique to timing server 500 and to supply it to the third module 586 as needed. Third module 586 is configured to respond to a timing master signal failure detected by the first module 584 to autonomously count up to the stored unique constant maintained by the second module 585. If the third module succeeds in counting to its unique constant, it may control the first module 584 to begin transmitting a timing master synchronization signal over one or more synchronous data buses 562, thereby implicitly declaring itself to be the current timing master. Third module 586 may be interrupted in its counting by receipt of a replacement timing master synchronization signal from another timing server. In that event, third module 586 cease counting and may control first module 584 to synchronize to the replacement timing master signal. The functional partitioning of the modules 584–586 is only exemplary, any various other partitions may be determined on a case-by-case basis.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus for providing a fail-operational global time reference for a redundant synchronous data bus system including a first primary data bus, a second primary data bus, a first redundant data bus, and a second redundant data bus, the apparatus comprising:

a first plurality of timing servers cross-coupled to said first data buses and configured to receive timing synchronization signals from said second primary data bus;

a second plurality of timing servers cross-coupled to said second data buses and configured to receive timing synchronization signals from said first primary data bus, each of the first and second plurality of timing servers including a counter; and a unique constant stored in each timing server, wherein each said timing server of said first and second pluralities of timing servers is configured to independently and automatically execute a selection protocol responsive to a failure of a timing master to select one timing server from among the first and second pluralities of timing servers to be a replacement timing master based upon synchronization signals received from at least one timing server of said first and second pluralities of timing servers and upon a relationship among said unique constants stored in said timing servers, wherein each said timing server is configured to transmit, receive, and monitor synchronization signals from each of said first and second pluralities of timing servers, each said counter is responsive to the failure of the timing master to initiate counting from a starting point to count toward each respective stored unique constant, and each said timing server is further configured to transmit a master timing synchronization signal when said counter in said timing server has completed counting to said unique constant stored in said timing server.

2. The apparatus of claim 1, wherein each said timing server is configured to self test its timing synchronization signal.

3. The apparatus of claim 1, wherein each said timing server is configured to test the timing synchronization signals of other timing servers.

4. A timing server for providing a fail-operational global time service for a synchronous data bus system interconnecting at least one plurality of timing servers coupled to at least one data bus in said synchronous data bus system, the timing server comprising:

a first module configured to transmit synchronization signals and to receive and monitor synchronization signals from each timing server of said at least one plurality of timing servers;

a second module configured to store a unique constant; and a third module configured to independently and automatically select one or more timing servers from among the at least one plurality of timing servers to be timing master based at least partially upon a relationship among unique constants associated with each timing server and upon said synchronization signals received from one or more of said timing servers of said at least one plurality of timing servers, the third module further configured to include a counter, and in response to a monitored failure of the timing master, to initiate counting from a starting point toward the unique constant, the third module initiating the transmission of a master timing synchronization signal when the counter has completed counting to the unique constant.

5. The timing server of claim 4, wherein said third module is further configured to synchronize to said synchronization signal from said timing master upon first reception of said synchronization signal from said timing master.

6. The timing server of claim 4, wherein said third module is further configured to transmit the timing master synchronization signal responsive to receiving timing master synchronization signals from two or more other timing servers for more than a predetermined period of time.

7. An apparatus for providing a fail-operational global time service for a synchronous data bus system interconnecting at least one plurality of timing servers coupled to at least one data bus in said synchronous data bus system, wherein:

each said timing server of the at least one plurality of timing servers is initially configured to transmit synchronization signals and to receive and monitor synchronization signals from each timing server of said at least one plurality of timing servers;

each said timing server of the at least one plurality of timing servers includes a counter and is configured to store a unique constant; and each said timing server of the at least one plurality of timing servers is configured to independently and automatically select one or more timing servers from among the at least one plurality of timing servers to be timing masters based upon said synchronization signals received from one or more of said timing servers of said at least one plurality of timing servers and based upon a relationship among said unique constants stored in each timing servers, wherein each said timing server of the at least one plurality of timing servers is further configured to:

count toward a unique predetermined constant in response to detection of a failure of a timing master synchronization signal to which said each timing server is synchronized;

if no other timing master synchronization signal is received before said counting reaches said unique predetermined constant transmitting a replacement timing master synchronization signal; and if the other timing master synchronization signal is received before said counting reaches said unique predetermined value, synchronizing to the other timing master synchronization signal.

8. The apparatus of claim 7, wherein each said timing server of the at least one plurality of timing servers is further configured to synchronize to said synchronization signal from said timing master upon first reception of said synchronization signal from said timing master.

9. The apparatus of claim 7, wherein each said timing server of the at least one plurality of timing servers is further configured to transmit the replacement timing master synchronization signal responsive to receiving timing master synchronization signals from two or more other timing servers for more than a predetermined period of time.

10. A method of selecting a timing master in a fail-operational global time reference in a synchronous data bus system having at least one plurality of timing servers coupled to at least one data bus of said synchronous data bus system, one said timing server acting as a timing master, the method comprising the steps of, in each operable timing server of the at least one plurality of timing servers:

detecting a failure a synchronization signal of the timing master;

counting toward a unique predetermined constant in response to detection of the failure of the timing master synchronization signal;

if no other timing master synchronization signal is received before said counting reaches said unique predetermined constant, transmitting a replacement timing master synchronization signal; and if the other timing master synchronization signal is received before said counting reaches said unique predetermined value, synchronizing to said other timing master synchronization signal.

11. The method of claim 10, further comprising responding to reception of the other timing master synchronization signal from another timing server by ceasing to produce the replacement timing master synchronization signal alter a predetermined period of time.

12. The method of claim 10, further comprising the step of transmitting the replacement timing master synchronization signal in response to receiving timing master synchronization signals from two or more timing servers for a period longer than a predetermined period.

13. The method of claim 10, further comprising the step of performing one or more tests on synchronization signals received from each timing server of the plurality of timing servers and adapting said one or more tests responsive to one or more failed tests.

14. A method executed in a local timing server coupled to at least one data bus, the method comprising the steps of:

monitoring a first timing master synchronization signal from a first remote timing server;

counting toward a unique constant in response to detecting a failure of said timing master synchronization signal in said monitoring step; and synchronizing to a second remote timing server as timing master if a second timing master synchronization signal is received from said second remote timing server during the counting step and otherwise transmitting a replacement timing master synchronization signal.

15. The method of claim 14, further comprising the steps of:

receiving a third timing master synchronization signal from a third remote timing server; and synchronizing to said third remote timing server as timing master.

16. The method of claim 15, further comprising the step of said local timing server ceasing to transmit the replacement timing master synchronization signal.

17. The method of claim 14, wherein if two timing master signals from said second and third remote timing servers are received for more than a predetermined amount of time, the method further comprising the steps of:

counting toward said unique constant; and synchronizing to a fourth remote timing server as timing master if a fourth master timing synchronization signal is received from said fourth remote timing server during the counting step and otherwise transmitting the replacement timing master synchronization signal.

18. The method of claim 14, wherein if the first or second timing master synchronization signal is no longer being received, the method further comprises the step of counting further comprising the steps of operating said local timing server automatically and independently until said synchronizing step.

19. The method of claim 14, further comprising the steps of:

monitoring the synchronization signal from each timing server; and determining failure of timing synchronization signals from remote timing servers based at least in part on the step of monitoring.

20. The method of claim 19, further comprising the steps of:

comparing an actual time of arrival of the first synchronization signal to the designed time of arrival of the first synchronization signal and to a predetermined tolerance; and determining that the timing server has failed if a difference between the actual time of arrival of the first synchronization signal and the designed time of arrival of the first synchronization signal exceeds the predetermined tolerance.

21. The method of claim 20, further comprising the steps of:

measuring a temporal gap between the time of arrival of said first synchronization signal and the termination time of a prior synchronization signal; and determining whether the first synchronization signal or the prior synchronization signal has failed based, at least in part, on the size of said gap.

22. The method of claim 21, further comprising the steps of:

monitoring timing parameters of the local timing server to determine internal timing integrity; and determining failure of said local timing server based at least in part on the step of monitoring timing parameters of the local timing server.

23. The method of claim 22, wherein each timing server is designed to produce a frame tick periodically to within a frame tick tolerance, the step of monitoring further comprising the steps of:
- comparing an actual frame tick period with the designed frame tick period and said frame tick tolerance; and
- determining that said timing server has failed If a difference between the actual frame tick period and the designed frame tick period exceeds the frame tick tolerance.

24. A computer-readable media, comprising:
- a set of instructions executable by a timing server to automatically and independently select a timing master from among a plurality of identically instructed timing sewers coupled to at least one bus in a synchronous data bus system, wherein said selection is made based upon time synchronization signals received by said timing server and further based upon a constant unique to each said timing server; the set of instructions further initiating a counter to count toward the unique constant in response to detection of a failure of a received timing master synchronization signal to which said each timing server is synchronized; if no other timing master synchronization signal is received before said counting reaches said unique constant, transmitting a replacement timing master synchronization signal; if the other timing master synchronization signal is received before said counting reaches said unique predetermined value, synchronizing to the other timing master synchronization signal.

25. The computer-readable media of claim 24, wherein said set of instructions is stored in a memory in a timing server.

* * * * *

UNITED STATES PATENT AND TRADEMARK OFFICE
CERTIFICATE OF CORRECTION

PATENT NO. : 7,237,152 B2  Page 1 of 1
APPLICATION NO. : 10/692972
DATED : June 26, 2007
INVENTOR(S) : Victor Y. Chiu and Dale D. Davidson It is certified that error appears in the above-identified patent and that said Letters Patent is hereby corrected as shown below:

Col. 15, Line 14-15,
In Claim 24, replace "identically instructed timing sewers" with --a identically instructed timing servers--

Signed and Sealed this

Twenty-seventh Day of November, 2007

JON W. DUDAS
*Director of the United States Patent and Trademark Office*